No. 610,230. Patented Sept. 6, 1898.
F. F. DOW.
MACHINE FOR FELLING TREES.
(Application filed June 19, 1897.)
(No Model.) 6 Sheets—Sheet 1.
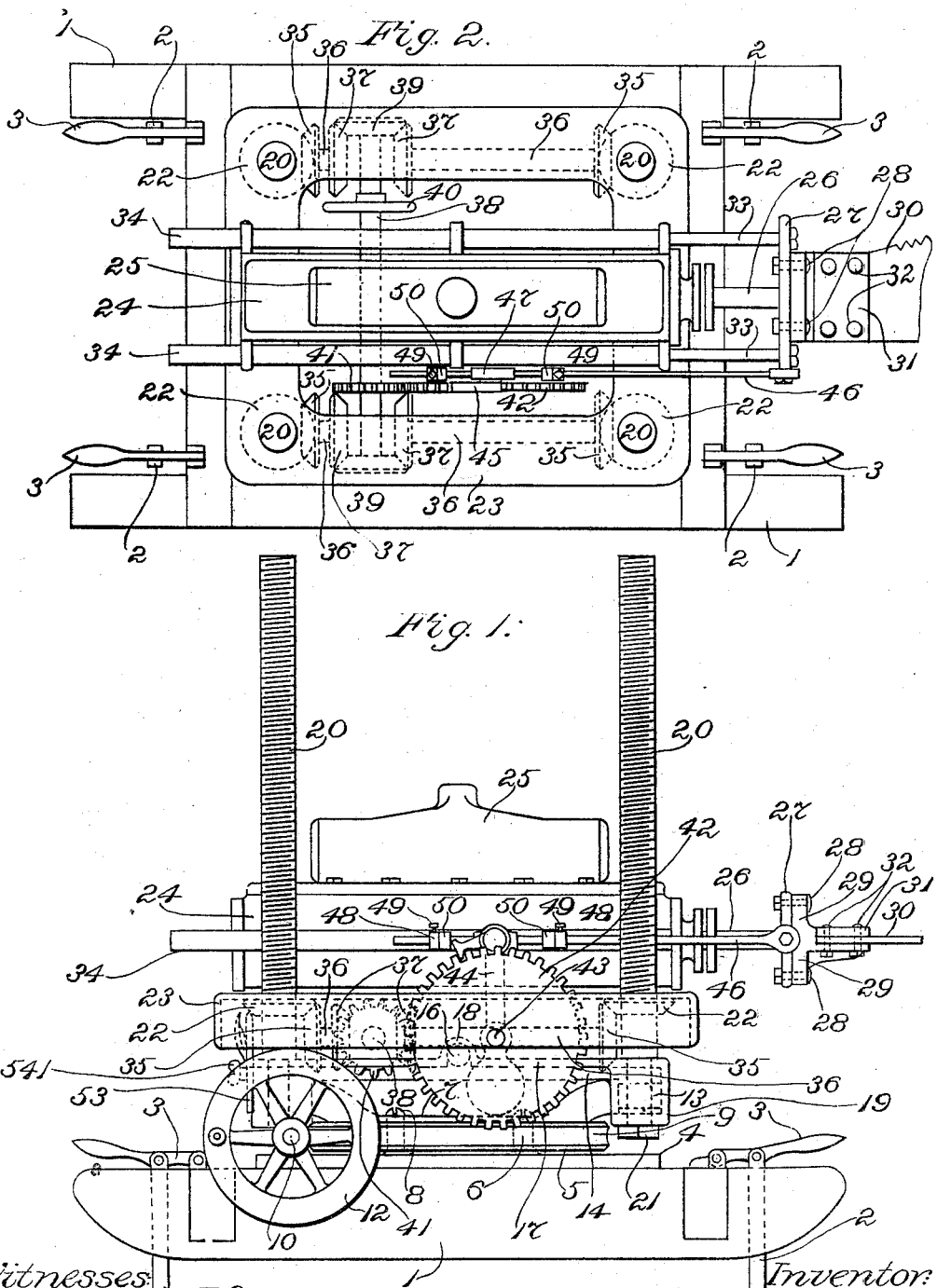
Witnesses
Oscar F. Hill
Alice H. Morrison
Inventor:
Fred F. Dow
by Macleod Calver & Randall
Attorneys.

No. 610,230. Patented Sept. 6, 1898.
F. F. DOW.
MACHINE FOR FELLING TREES.
(Application filed June 19, 1897.)
(No Model.) 6 Sheets—Sheet 2.
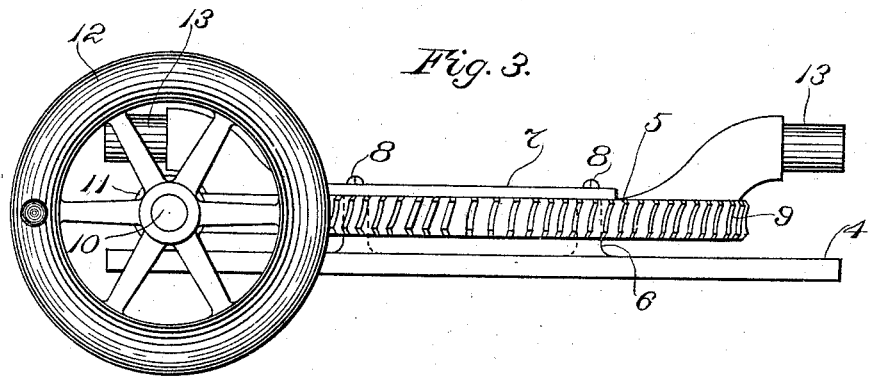
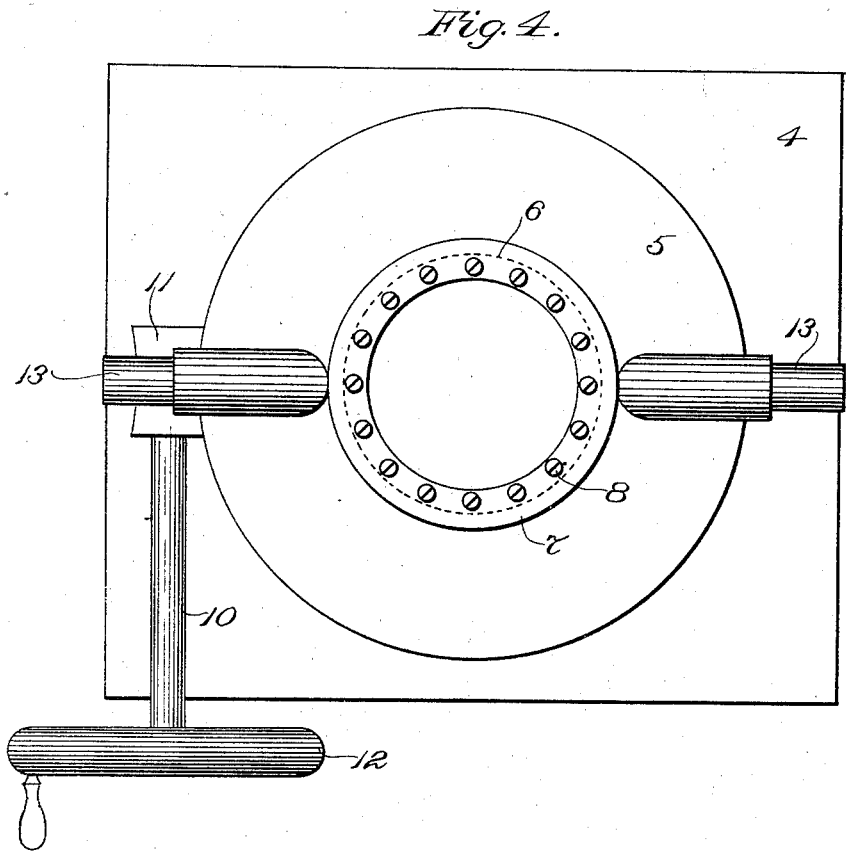

No. 610,230. Patented Sept. 6, 1898.
F. F. DOW.
MACHINE FOR FELLING TREES.
(Application filed June 19, 1897.)
(No Model.) 6 Sheets—Sheet 3.
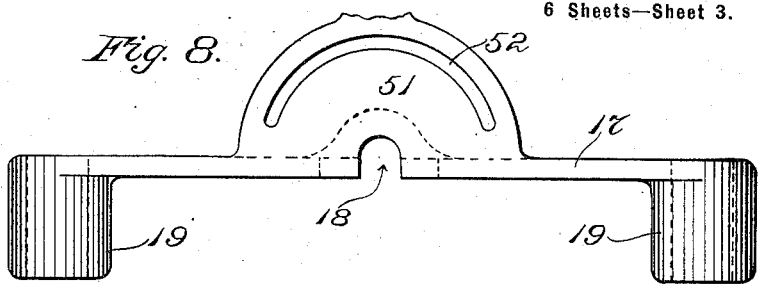
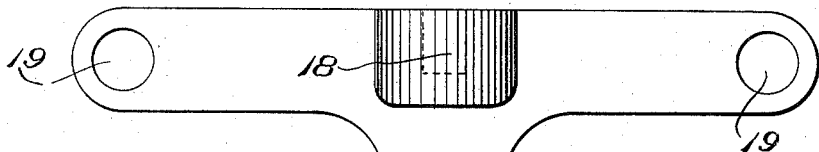
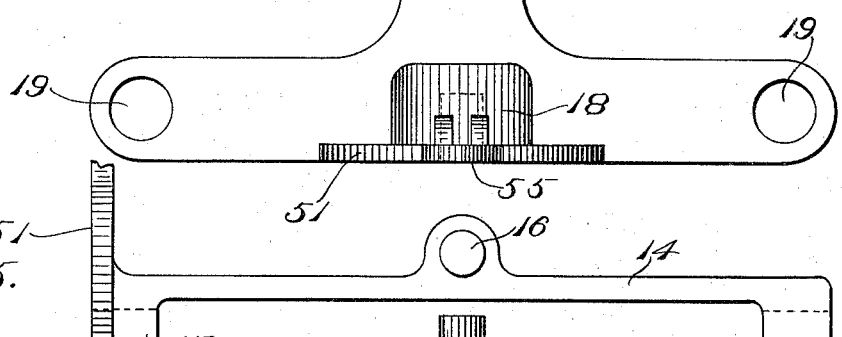
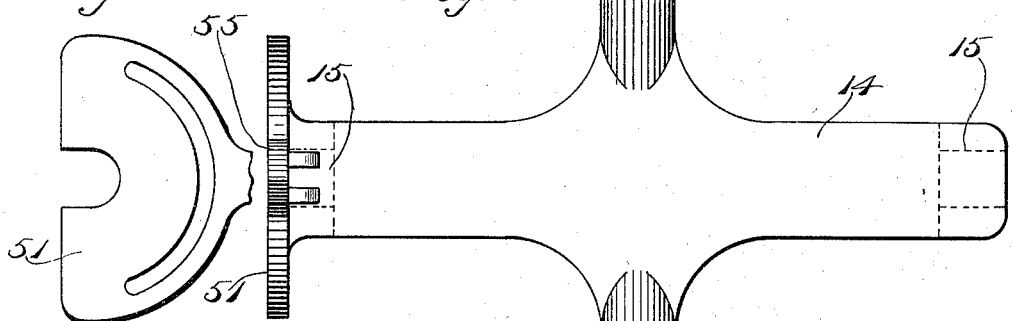
Witnesses:
Oscar F. Hill
Alice H. Morrison
Inventor:
Fred F. Dow
by Macleod Calver
& Randall
Attorneys.

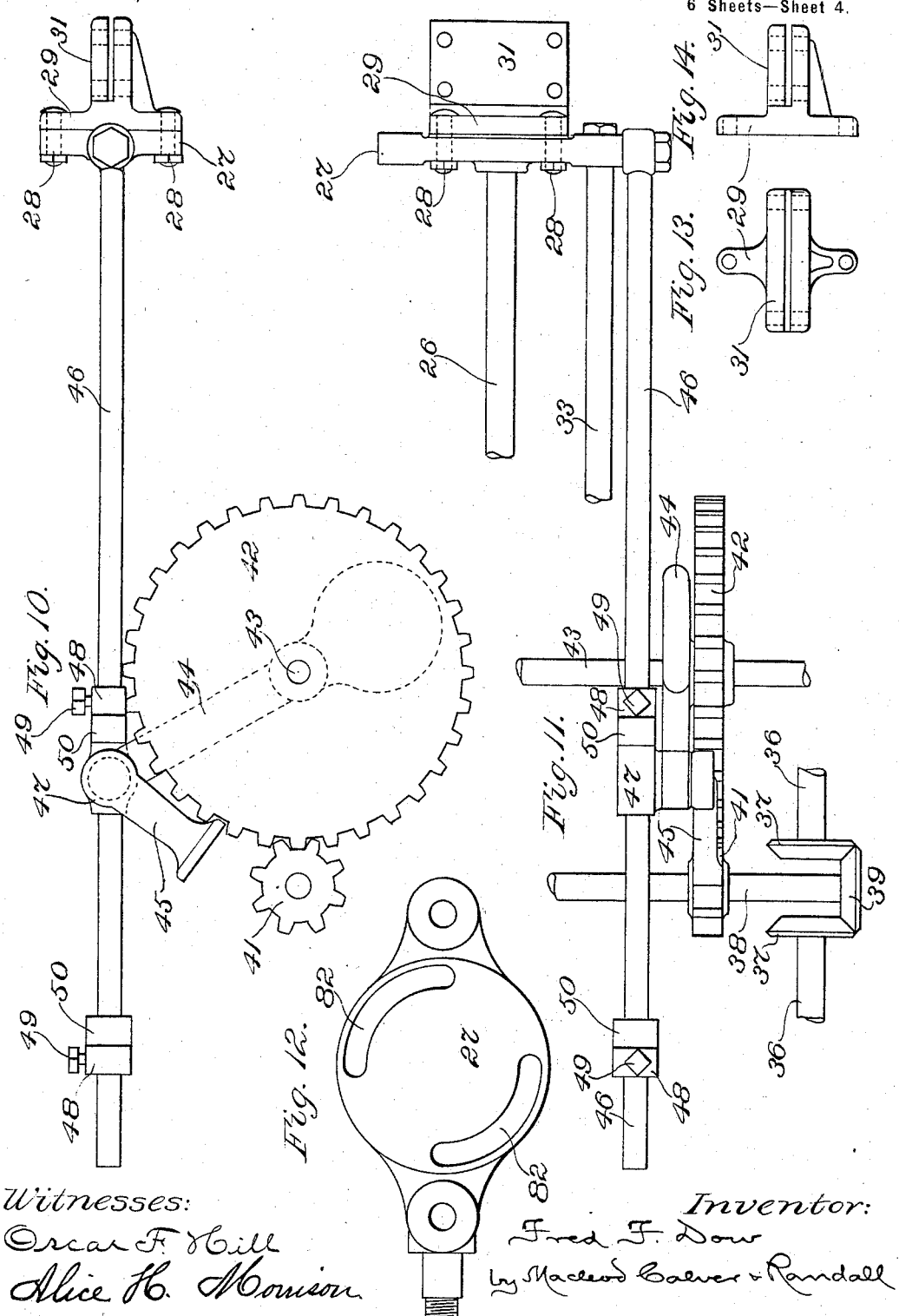

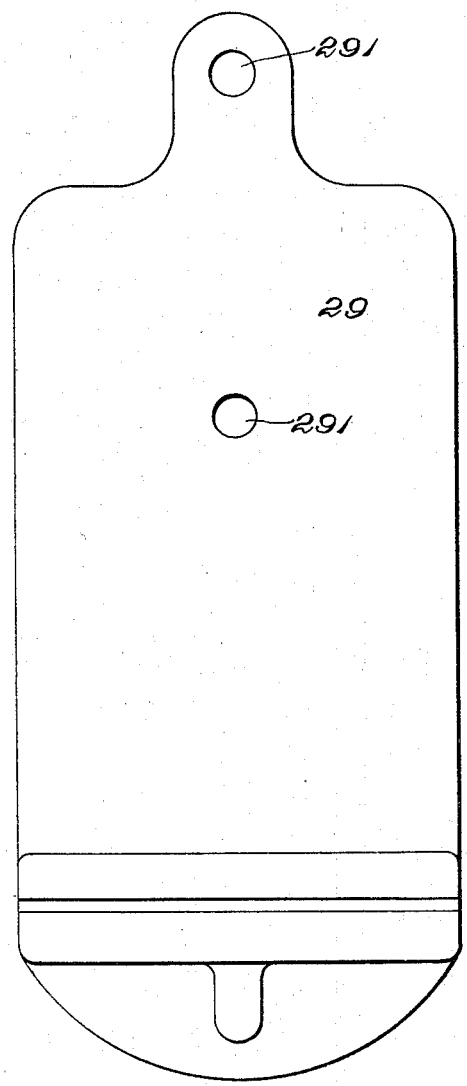
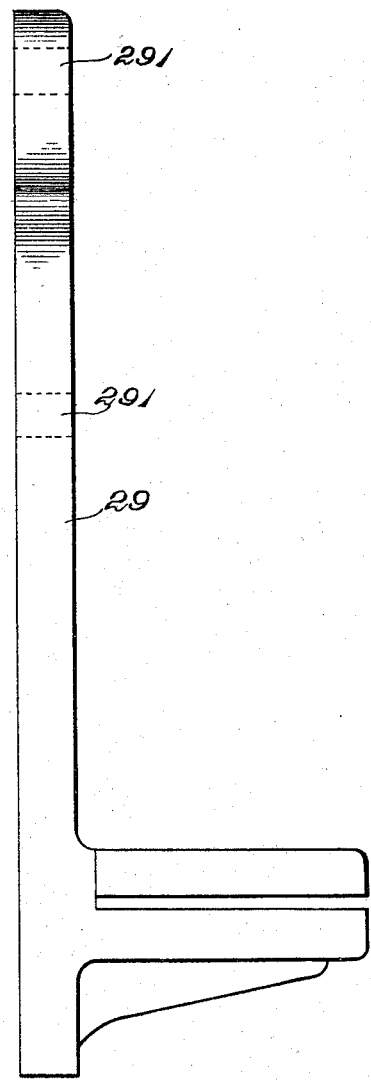

No. 610,230. Patented Sept. 6, 1898.
F. F. DOW.
MACHINE FOR FELLING TREES.
(Application filed June 19, 1897.)
(No Model.) 6 Sheets—Sheet 6.
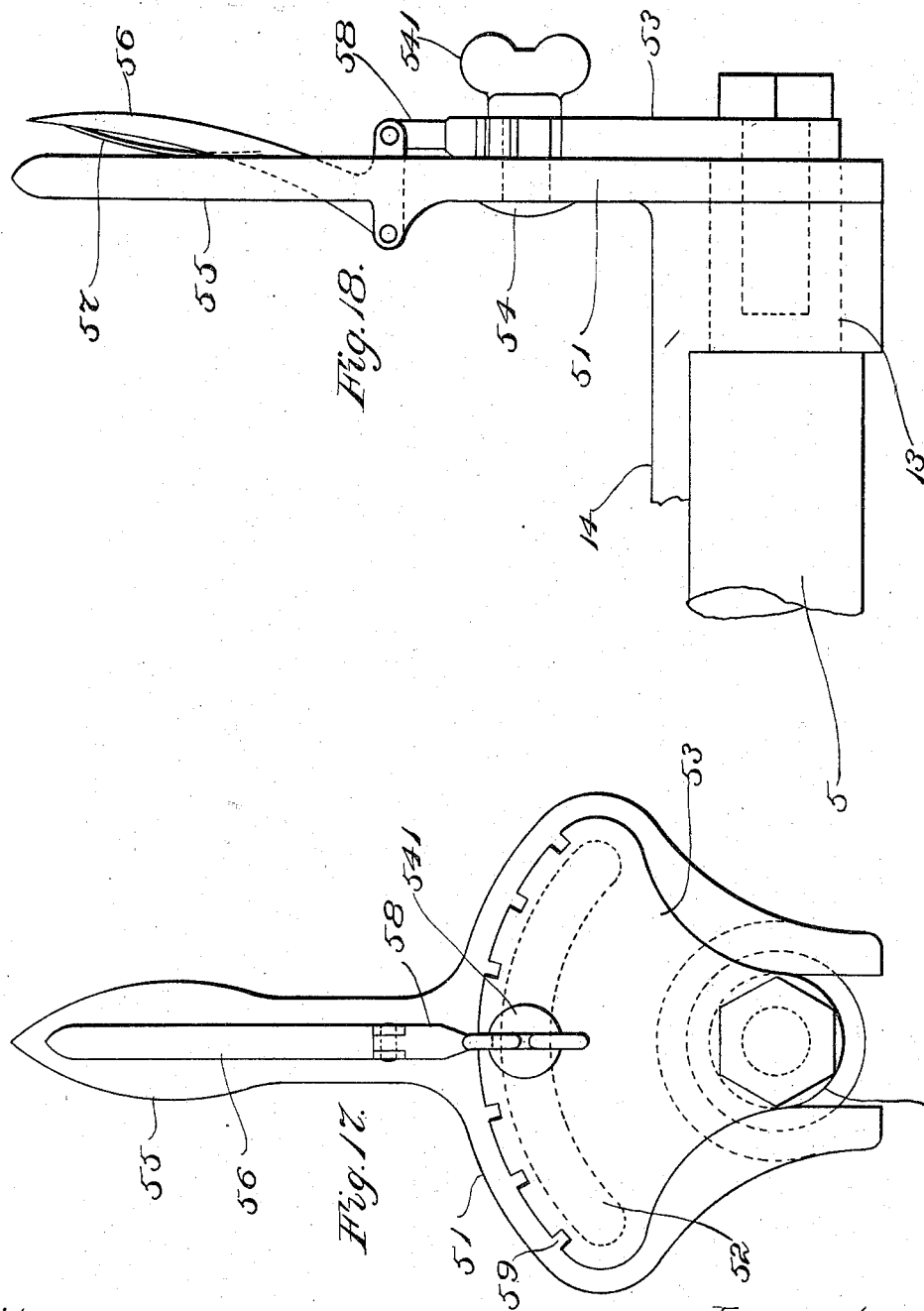
Witnesses:
Oscar F. Hill
Alice H. Morrison
Inventor:
Fred F. Dow
by Macleod Calver & Randall
Attorneys.

United States Patent Office.

FRED F. DOW, OF LYNN, MASSACHUSETTS, ASSIGNOR, BY MESNE ASSIGNMENTS, TO THE DOW MACHINERY MANUFACTURING COMPANY, OF SAME PLACE.

MACHINE FOR FELLING TREES.

SPECIFICATION forming part of Letters Patent No. 610,230, dated September 6, 1898.

Application filed June 19, 1897. Serial No. 641,403. (No model.)

*To all whom it may concern:*

Be it known that I, FRED F. DOW, a citizen of the United States, residing at Lynn, in the county of Essex and State of Massachusetts, have invented certain new and useful Improvements in Machines for Felling Trees, of which the following is a specification, reference being had therein to the accompanying drawings.

The object of my invention is to provide a practical and efficient machine in which the saw is actuated by means of steam or other suitable power, which shall be of comparatively small weight and easily transportable from place to place, so as to enable it to be positioned near the tree or trees upon which it is required to operate, in which the operating parts shall stand firmly and steadily while at work, which shall be so constructed as to enable a considerable number of trees to be felled without necessitating relocation of the machine, which shall be capable of cutting in oblique directions, and which shall not only be capable of felling trees, as above referred to, but shall also be capable of cutting down the stumps of felled trees close to the ground, as required in swamping out a road through a forest region or whenever for some reason or reasons it is necessary that the stump should be cut away close to the ground.

The invention consists in a machine of novel construction and character embodying various novel combinations of parts, all as first will be described fully with reference to the accompanying drawings, in which latter I have illustrated the best embodiment of the invention which I have yet contrived, and as afterward will be particularly pointed out and distinctly defined in the claims at the close of this specification.

Figure 1 of the drawings is a view in side elevation of a machine containing the said embodiment of my invention. Fig. 2 is a view showing the said machine in plan. Fig. 3 is a view in side elevation of the turn-table which is referred to hereinafter, the platform on which it is mounted, and the means by which the said turn-table is adjusted around its center of movement. Fig. 4 is a view in plan of the parts which are represented in Fig. 3. Fig. 5 is a view in elevation of the lower swing-frame—namely, the one which is mounted pivotally upon the trunnions which are provided upon the turn-table. Fig. 6 is a view in plan of the said frame. Fig. 7 is a view in elevation of the end of the said frame which is at the left in Fig. 6. Fig. 8 is a view in elevation of the upper swinging frame. Fig. 9 is a view thereof in plan. Fig. 10 is a view in side elevation of certain of the parts which pertain to the automatic feed. Fig. 11 is a view in plan of the said parts. Fig. 12 is a view in elevation, looking from the right-hand side in Figs. 1 and 2, of the cross-head to which the saw-carrying clamp is applied. Fig. 13 is a view in front elevation of one form of saw-carrying clamp. Fig. 14 is a view thereof in side elevation. Fig. 15 is a view in front elevation of the form of saw-carrying clamp which is provided for use in swamping out roads. Fig. 16 is a view of the said clamp in side elevation. Figs. 17 and 18 are views in end and side elevation of certain adjusting devices.

My machine is intended to be transportable, so that it may be moved about and located wherever its services are required to be performed. With the end in view of enabling it to be shifted readily from place to place I employ as the base or support thereof a truck or carriage 1, which latter preferably is made after the fashion of a sledge—that is to say, is equipped with runners, as shown, on which it may be drawn about. These runners are particularly serviceable when the machine is used during the cold months of the year and also when it is used in wet or marshy ground. They facilitate the movement of the machine and in addition afford a broad, secure, and stable means of support. For the purpose of guarding against undesired movement of the truck under the strain and vibrations which are experienced when the machine is at work I provide a means of anchoring the truck firmly in place, which means may consist, conveniently, of spikes, as 2 2, arranged vertically and connected with actuating-levers 3 3, which levers are pivoted to suitable portions of the truck and serve to enable the said spikes to be forced into the surface on which the truck rests and afterward withdrawn therefrom.

4 is a platform which is secured to the truck, and 5 (see more particularly Figs. 3 and 4) is the turn-table, the latter being mounted in suitable manner on the upper side of the platform and turning around the central post 6, it being held from rising by means of the overlying ring or disk 7, the latter being held to the top of the said post by the bolts 8. For the purpose of enabling the turn-table to be turned around the post 6 at will by means of power applied by hand I form or provide the same with teeth forming a worm-gear 9, and upon the platform 4 I mount in suitable bearings a shaft 10, provided with a worm 11 in engagement with the worm-gear 9, the said shaft being equipped also with a hand-wheel 12, by means of which to rotate the same as desired.

13 13 designate opposite trunnions carried by the turn-table 5. 14, Figs. 1, 5, and 6, designates a frame which is formed or provided with sockets or bearings 15 15, the latter receiving the said trunnions and enabling the frame 14 to be supported thereupon above the turn-table, with capacity to swing vertically. The frame 14 is provided with trunnions 16 16, extending at right angles to the trunnions 13 13. 17 designates a second frame, (see Figs. 1, 8, and 9,) it being formed or provided with sockets or bearings 18 18, which receive the trunnions 16 16, thereby supporting frame 17 upon and above frame 14, with capacity to swing vertically in a direction at right angles to that in which frame 14 swings upon the trunnions 13 13 of the turn-table 5. The frame 17 is shown as substantially H-shaped and as having the extremity of each arm thereof formed with a socket 19. Into these sockets are fitted the reduced lower ends of four screws 20 20. The shoulders which are formed on the said screws, at the upper ends of the reduced portions thereof, rest on the top of the sockets 19 and support the screws vertically. Nuts 21 are turned onto the reduced lower ends of the said screws, which ends are threaded to receive the said nuts, and thereby the screws are held securely in place. Upon the screws 20 20 are fitted the miter-gears 22 22, which are threaded internally to fit the threaded bodies of the screws. Upon these miter-gears 22 22 rests or is supported a carriage 23, Fig. 1, the latter having mounted thereupon the steam-cylinder 24, 25 being the valve-chest of the latter. 26 designates the piston-rod which works within the said cylinder, and 27 designates a cross-head at the outer end of the said piston-rod, the said cross-head having affixed thereto by means of bolts 28 28 the body 29 of the clamp which holds the saw 30.

31 designates the removable part of the saw-clamp, the said removable part being secured in place by bolts, as 32. The bolts 28 28 pass through opposite curved slots 82 82, Fig. 12, which are provided in the cross-head 27 for the purpose of enabling the saw-clamp to be adjusted so as to hold the saw, which is attached thereto, either vertically, horizontally, or at any desired angle intermediate these two positions. For the purpose of relieving the piston-rod of a part of the strain which is due to the weight of the cross-head, saw-clamp, and the saw 30 I attach to the cross-head 27, at opposite sides thereof, the stay-rods 33 33, which work within guide-tubes 34 34, the latter being mounted in fixed position at the opposite sides horizontally of the cylinder 24. These tubes 34 34 are slightly longer than the cylinder, and they coöperate with the stay-rods 33 33 in supporting the weight of the projected portion of the piston-rod and of the parts which are attached thereto, so as to relieve the bearings of the piston-rod and reduce the wear thereof.

35 35 are miter-gears meshing with the miter-gears 22 22, which are applied to the screws 20 20, as described hereinabove. Each of these miter-gears 35 35 is mounted upon the outer extremity of a short shaft 36, the four shafts 36 being mounted in suitable bearings attached to the under side of the carriage 23. On each side of the machine two of these shafts are arranged in line with each other, and to their proximate ends are applied miter-gears 37 37. A shaft 38, extending crosswise of the machine and supported in bearings attached to the carriage 23, has applied to each end thereof a miter-gear 39, the latter engaging with the pair of miter-gears 37 on the corresponding side of the machine. By means of the miter-gears 35, 37, and 39 and the shafts 36 and 38 the miter-gears 22 22 are all connected so as to turn in unison, and it will be obvious that when power is applied at any point in the train of connections the series of miter-gears 22 22 will be rotated upon the respective screws 20 20, and it will be perceived that according to the direction in which the said miter-gears 22 22 are turned the carriage 23 and the parts which are attached thereto will be either raised or lowered in a direction extending lengthwise of the screws 20 20. At 40 I have shown a hand-wheel which is affixed upon the cross-shaft 38, and by means of power applied by hand to the said hand-wheel motion may be communicated at will to the series of miter-gears 22 22 for the purpose of raising or lowering the carriage 23 and attached parts, as desired. If it is so desired, the hand-wheel 40 may be utilized for the purpose of moving the carriage during the regular working of the machine, so as to feed the saw to its work; but preferably I employ the said hand-wheel only for the purpose of making occasional hand adjustment, and I provide automatic feed devices, one form of which I will now proceed to describe.

41 is a spur-pinion fast on the cross-shaft 38, and 42 is a spur-gear which is mounted on the second cross-shaft 43.

44 is an arm that is mounted pivotally on the cross-shaft 43, a double or reversible driver or pawl 45 being connected pivotally with the upper arm of the said lever and the lower arm of the lever being counterweighted, as shown most clearly in Figs. 10 and 11, so that the lever tends to assume and maintain normally a substantially vertical starting position.

46 is a feed-rod which is connected with the cross-head 27, the said rod being passed through a hole in a block 47, that is connected pivotally to the upper arm of the lever 44. 48 are stops in the form of blocks or collars, which are mounted on the said rod 46 and made adjustable thereon in suitable manner. In the illustrated embodiment of the invention the said blocks or collars are mounted on the said rod with capacity for movement endwise thereof and are secured in the required positions by means of clamping-screws 49 49. When the machine is at work, the feed-rod 46 reciprocates in unison with the piston-rod and saw and transmits movement by means of one of the blocks 48 48 and the block 47 to the lever 44 and pawl 45. The said pawl, through its engagement with the teeth of the gear-wheel 43, actuates the latter, and from the said gear-wheel motion is transmitted through the gearing which has been described to the miter-gears 22 22, and thereby the carriage 23 and parts supported thereby are fed downward. The rate of feed is varied, as required, by making adjustment of the actuating block or blocks 48 48 upon the feed-rod 46. After the carriage 23 has been fed downward in the working of the machine to the extent which is required for the cut sought to be produced the machine may be stopped and the carriage 23 may be raised again by hand through power applied to the hand-wheel 40, or, if desired, the said carriage may be raised again automatically by simply continuing the machine at work and reversing the driver or pawl 45, so as to rotate in a reversed direction the gear-wheel 43 and the miter-gears 22 22, which are driven therefrom. If desired, buffers 50 50, consisting of either springs or pieces of suitable cushioning material, may be interposed between the blocks 48 48 and the block 47.

In the use of my machine it is drawn to a position which is conveniently adjacent to the tree which is to be felled, and it is there fixed in place by forcing the spikes 2 2 into the surface on which the truck 1 rests. The saw being placed in engagement with the periphery of the trunk of the tree, the power is permitted to operate the same. The automatic feed devices, when thrown into action, serve to advance the edge of the saw at the predetermined rate, so that the cutting shall be constant. The machine may be made to cut in any direction. Thus the saw having been attached in a horizontal position to the cross-head 27, the automatic feed devices having been thrown out of action, and the wheel 12 being operated by hand, so as to turn the turn-table about its center of movement, a horizontal cut may be effected. An oblique or inclined cut extending from the exterior of the tree either downwardly or upwardly may be produced by setting the saw vertically with reference to the cross-head 27 and then turning the frame 14 upon the trunnions 13 13, so as that the feed-screws 20 20 shall stand at the proper angle transversely. Having set the feed-screws at an inclination corresponding with that of the desired cut and turned on the power, the saw may be fed to its work either by hand, by power applied to hand-wheel 40, or automatically through the automatic feed devices which have been described.

In consequence of the capacity for adjustment of the feed-screws into an inclined position, whereby the feed movement of the saw is caused to take place in a laterally-inclined direction, the machine is adapted for use in felling trees by forming a cut or kerf in an inclined or oblique direction with reference to the length of a tree, the said cut or kerf beginning at one side of the tree and extending to or approximately to the center of the tree, and then forming a second cut or kerf opposite the first also in an inclined or oblique direction relatively to the length of the tree and tending to intersect or join, or approximately do so, the first cut or kerf at or adjacent to the center of the tree, as set forth in my application for United States Letters Patent filed May 22, 1897.

The machine is well adapted for use in sawing transversely through the trunk of a fallen tree, the saw being enabled to work either in a truly vertical position or in whatever position of inclination may be required in order to place it at right angles to the length of a fallen tree, the trunk of which occupies a more or less inclined position.

The purpose for which the frame 17 is mounted on the trunnions 16 16 is to enable the said frame 17 and parts which are mounted thereon to be so set or adjusted as to incline the saw in the direction of its length with reference to the horizon, thereby enabling the length of the cut or kerf to be made at any inclination which is desired with reference to the horizon. For the purpose of holding the parts in their proper position of adjustment after either frame 14 or frame 17 has been swung upon the trunnions on which the same is supported a suitable locking means is provided in connection with each frame, here shown as consisting of a plate 51, Figs. 5, 6, 7, 8, 9, 17, and 18, which is provided on each of the frames 14 and 17 and formed with a curved slot 52, the latter being concentric with the trunnions 13 13 or 16 16. To the end of the trunnion adjacent to each of the said plates 51 I apply a segment 53. A bolt 54, passing through a hole in segment 53 and also through the curved slot 52, is provided with a wing-nut 541 or the like device, by means of which to clamp frame 17 in the desired position of adjustment on the trunnions of frame 14 and to clamp frame 14 in the desired position of adjustment on the trunnions of the turn-table. For convenience in setting the frames 14 and 17 each plate 51 has a handle 55, and in order to aid in fixing the desired position of each swinging frame a lever 56 may be pivoted to each plate 51, it being acted upon by a spring 57, Fig. 18, and having connected thereto a bolt or the like detent, entering notches 59 in the curved edge of segment 53. If desired, the locking devices just described may be relied upon alone, and the bolt 54, nut 541, and slot 52 may be dispensed with. Any other suitable and convenient means of holding the frames 14 and 17 in the desired position after having been set properly may be substituted in lieu of the devices which have just been described.

In consequence of the capacity for double adjustment upon the turn-table 5 of the mounting or support for the feed-screws 20 20—that is to say, in two directions at right angles to each other upon the trunnions 13 13 and 16 16, which in effect is capacity for universal adjustment to the extent which is requisite in practice—it is possible to enable the saw to work in the best position and in the required direction, whatever may be the angle or direction of inclination or slope of the surface upon which the truck 1 rests. The turn-table and the means of rotating the same upon the platform 4 enable the saw to be swung around so as to work in succession upon all of the trees which may be within reaching distance. Thus after the truck has been positioned within or adjacent to a group of trees all of such trees which are not too far remote from the center of the turn-table may be reached and felled by turning the turn-table about its center on the truck.

It sometimes is necessary after trees have been felled to remove the stumps as close to the ground as possible. This sometimes is done in swamping out a road. For the purpose of enabling the saw to cut close to the ground I employ the form of saw-clamp which is shown in detail in Figs. 15 and 16, it differing from the form of clamp which is represented in Figs. 1, 2, 13, and 14 in that the body 29 thereof is formed with a vertical extension, the holes 291 291, through which are passed the bolts 28 28, which fasten the clamp to the cross-head 27, being made in the upper end of the said extension, as shown clearly in Figs. 15 and 16, and the jaws of the clamp being located close to the ground. As will be obvious, the form of saw-clamp which is shown in Figs. 15 and 16 may be reversed in position, thus raising the saw above the cross-head and enabling a tree to be cut at a greater distance from the ground.

I claim as my invention—

1. A tree-felling machine comprising a portable support, a saw, motive mechanism therefor, a mounting for said mechanism, devices for feeding the saw vertically with reference to the said mounting, and means to adjust the inclination of the said mounting laterally with respect to the length of the saw whereby the latter may be caused to make a cut or kerf which is laterally inclined or oblique with respect to the length of the tree, substantially as described.

2. A tree-felling machine comprising a portable support, a saw, motive mechanism therefor, a mounting for said mechanism, feed-screws applied to said mounting, means to effectuate the feeding of said mechanism lengthwise of the said screws, and means of adjustment whereby to adjust the inclination of the said mounting on said portable support laterally whereby the saw may be caused to make a cut or kerf which is laterally inclined or oblique with respect to the length of the tree with reference to the vertical, substantially as described.

3. A tree-felling machine comprising a portable support, a saw, motive mechanism therefor, a mounting for said mechanism, means to set the said mounting in a laterally-inclined position on said portable support, whereby the saw may be caused to make a cut or kerf which is laterally inclined or oblique with respect to the length of the tree, feed-screws applied to said mounting, the gears 22, 22, applied to the said feed-screws, and devices to actuate said gears and thereby automatically feed the saw to its work, such devices embracing a pawl, a wheel engaged thereby, and means to operate said pawl, substantially as described.

4. A tree-felling machine comprising a portable support, a saw, motive mechanism therefor, a mounting for said mechanism, feed-screws applied to the said mounting, the gears 22, 22, applied to the said feed-screws, and devices to actuate said gears and thereby automatically feed the saw to its work, such devices embracing a reciprocating feed-rod, adjustable stops thereon, a pawl, a pawl-carrier gravitating normally to its starting position, and a wheel engaged by the said pawl, substantially as described.

5. A tree-felling machine comprising a portable support, a saw, motive mechanism therefor, a mounting for said mechanism, devices for feeding the saw vertically with reference to the said mounting, and devices for effecting universal adjustment of the said mounting, substantially as described.

6. A tree-felling machine comprising a portable support, a saw, motive mechanism therefor, a mounting for said mechanism, devices for feeding the saw vertically with reference to the said mounting, a frame on which the said mounting is fitted with capacity to swing in a vertical plane, the said frame itself being applied to the said support with capacity to swing in a second vertical plane at right angles to the first, substantially as described.

7. A tree-felling machine comprising a portable support, a saw, motive mechanism therefor, a carriage on which said mechanism is mounted, a series of feed-screws, a series of gears 22, 22, applied to the said feed-screws, means to rotate said gears, a frame, as 17, to which the said feed-screws are applied, and a second frame as 14 on which the first frame is pivoted to swing vertically, the said second frame being mounted on the said support with capacity to swing vertically at right angles to the first frame, substantially as described.

8. A tree-felling machine comprising a portable support, a saw, motive mechanism therefor, a mounting for said mechanism, devices for feeding the saw vertically with reference to the said mounting, means to adjust the inclination of the said mounting laterally, and the turn-table mounted upon the said support and having the said mounting sustained thereupon, substantially as described.

9. A tree-felling machine comprising a portable support, a saw, motive mechanism therefor, a frame on which said mechanism is carried, a second frame on which the first frame is pivoted with capacity to swing vertically, and a turn-table on which the second frame is pivoted to swing vertically at right angles to the first frame, the said turn-table being mounted upon the said support, substantially as described.

10. A tree-felling machine comprising a portable support, a saw, motive mechanism therefor, a carriage on which the said mechanism is mounted, a series of feed-screws, a series of gears 22, 22, applied to the said feed-screws, means to rotate the said gears, a frame, as 17, to which the said feed-screws are applied, a second frame as 14, on which the first frame is mounted to swing vertically, and a turn-table on which the second frame is mounted to swing vertically at right angles to the first frame, the said turn-table being mounted upon the said support, substantially as described.

In testimony whereof I affix my signature in presence of two witnesses.

FRED F. DOW.

Witnesses:
CHAS. F. RANDALL,
WILLIAM A. COPELAND.